United States Patent [19]

Logan

[11] Patent Number: 5,238,268
[45] Date of Patent: Aug. 24, 1993

[54] MULTIPLE PIECE VEHICLE FENDER EXTENSION

[75] Inventor: Gerald A. Logan, Portland, Oreg.

[73] Assignee: Bushwacker Inc., Portland, Oreg.

[21] Appl. No.: 767,143

[22] Filed: Sep. 27, 1991

[51] Int. Cl.[5] .............................................. B62B 9/16
[52] U.S. Cl. .................................... 280/848; 280/849; 280/154; 296/198
[58] Field of Search ............ 280/848, 847, 153.5, 280/154, 849, 851, 850; 293/128, 155, 120; 296/207, 198, 151; 428/31, 189

[56] References Cited

U.S. PATENT DOCUMENTS

| 4,169,608 | 10/1979 | Logan | 280/848 |
|---|---|---|---|
| 4,235,466 | 11/1980 | Mandrik | 293/128 |
| 4,514,003 | 4/1985 | Guy | 280/850 |
| 4,570,383 | 2/1986 | Adell | 49/462 |
| 4,592,937 | 6/1986 | Nagata et al. | 428/31 |
| 4,620,745 | 11/1986 | Jacobs | 428/31 |
| 4,682,442 | 7/1987 | Adell | 49/462 |
| 4,784,430 | 11/1988 | Biermacher | 280/848 |

FOREIGN PATENT DOCUMENTS 794419  2/1936  France ............................ 296/151

Primary Examiner—Richard M. Camby
Attorney, Agent, or Firm—Kolisch, Hartwell, Dickinson, McCormack & Heuser

[57] ABSTRACT

A wheel-opening extension molding is disclosed for use on vehicle fenders which have a door or other removable or movable body part in close proximity to the wheel opening. Vehicle extension moldings, such as wide fender flares or the like, cannot be installed on some vehicles because they will interfere with the opening and closing of vehicle doors. The present invention provides a multiple-piece vehicular body extension for attachment to both the fender and door, and to other vehicle body parts, to present the appearance of a single-piece wide flare or fender extension. A first part of the extension molding is shaped to fit against the fender along the margin of the wheel opening. A notch or cut-out is formed in the extension molding to accommodate the opening and closing of the vehicle door. A second extension molding, having an outer face contoured to appear as an extension on the door of the first molding, is attached to the door. A system for attaching the two moldings is disclosed, including a separate mounting bracketpiece for attaching the second molding to the door.

18 Claims, 2 Drawing Sheets

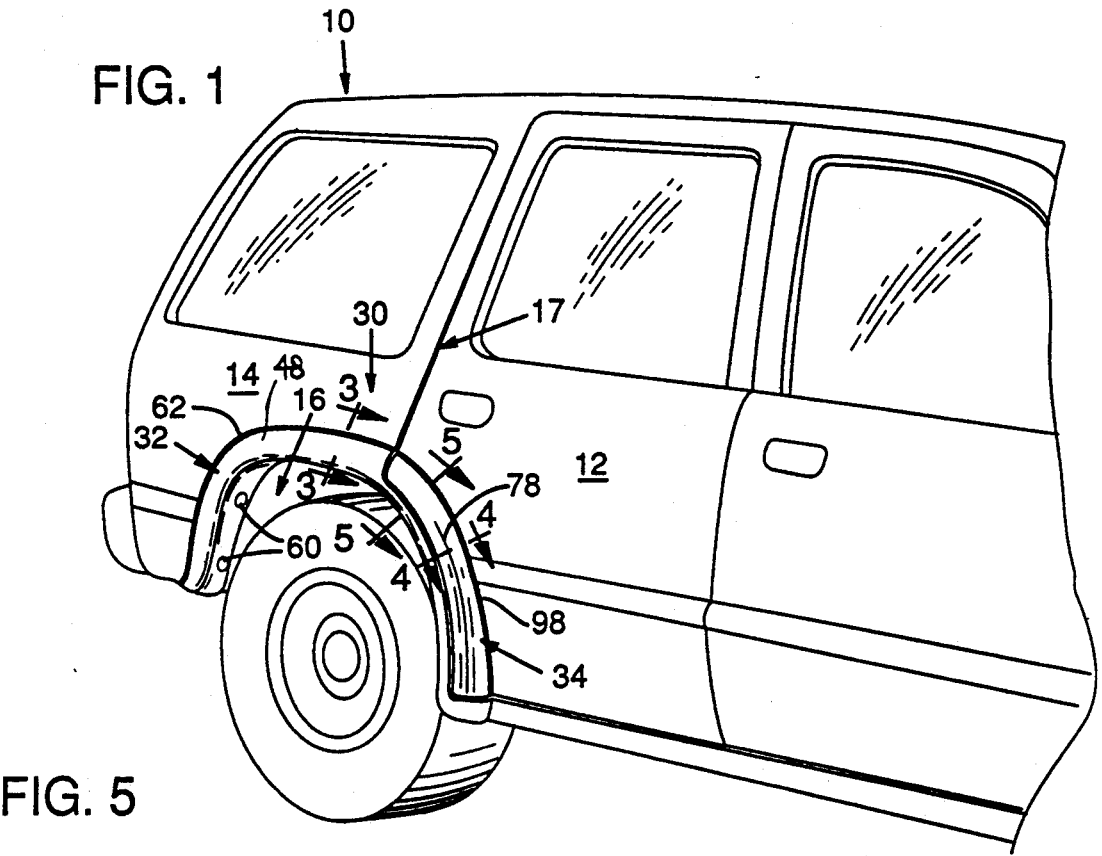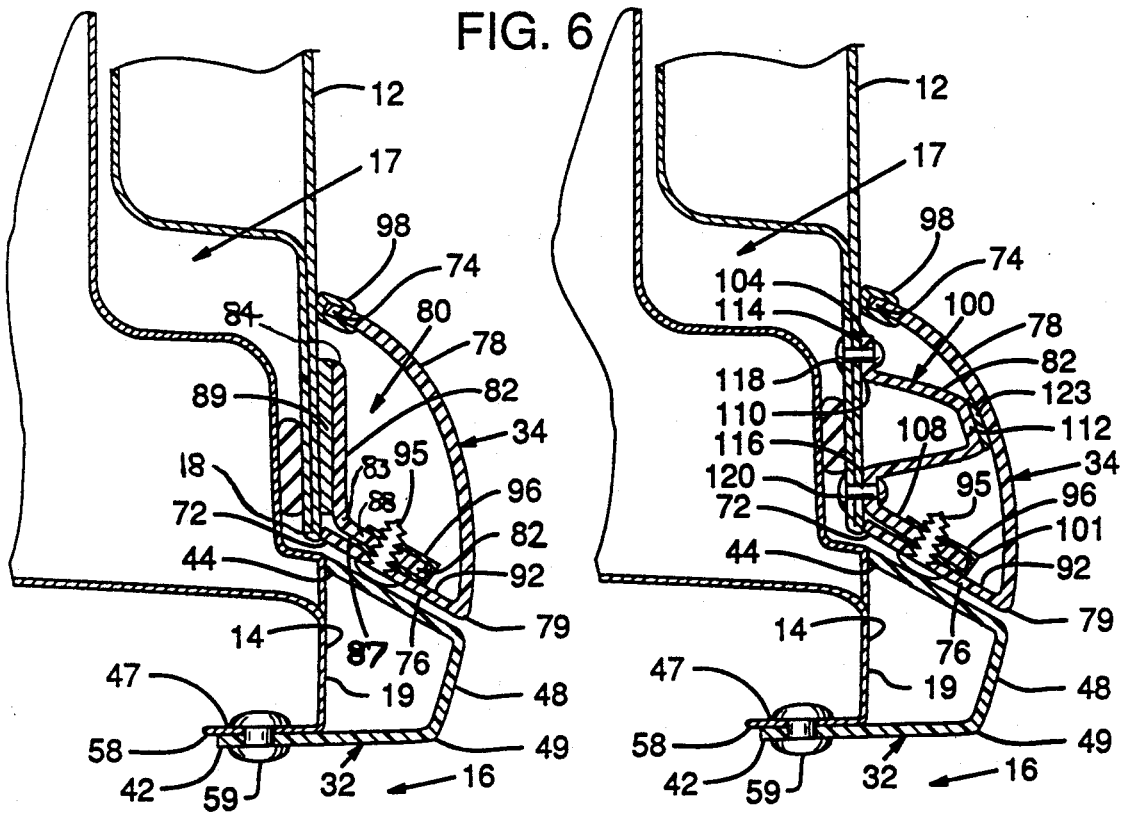

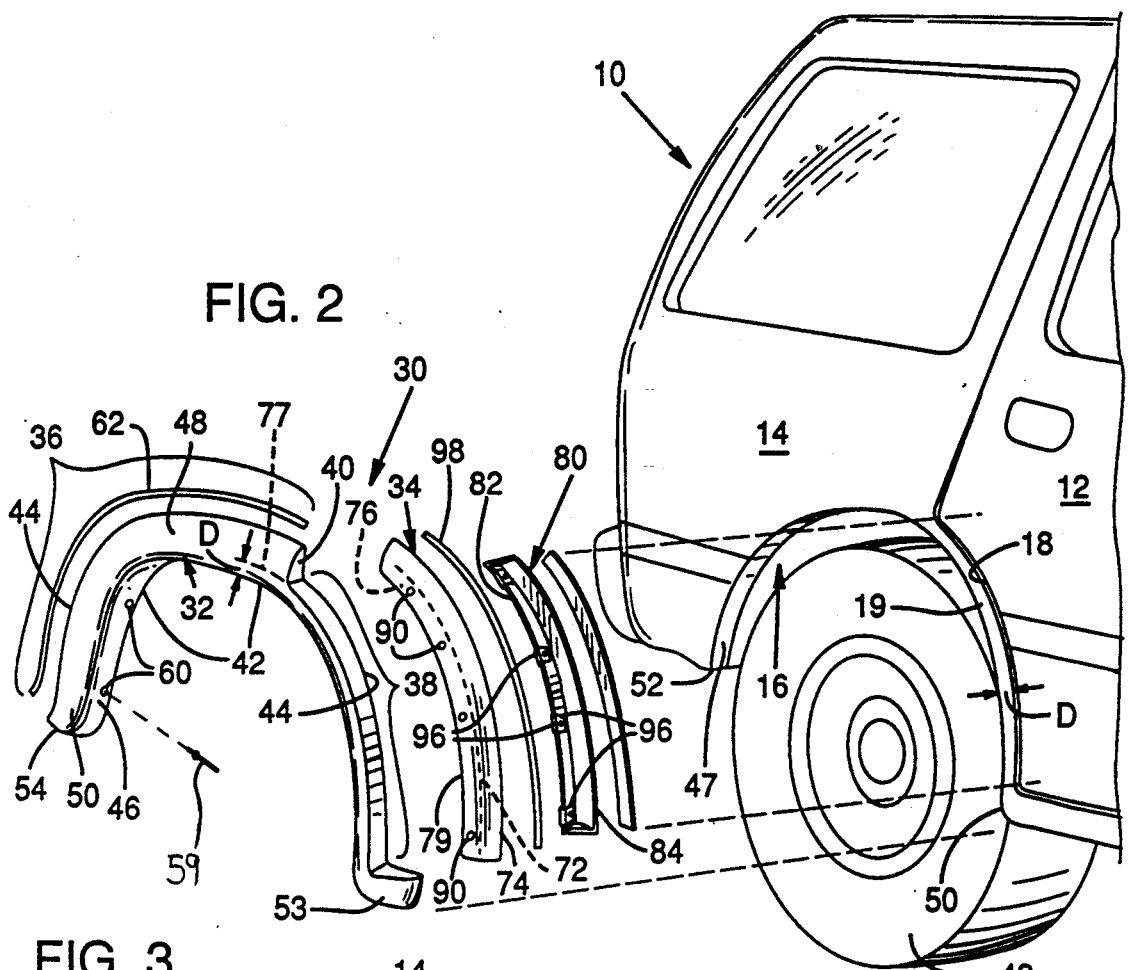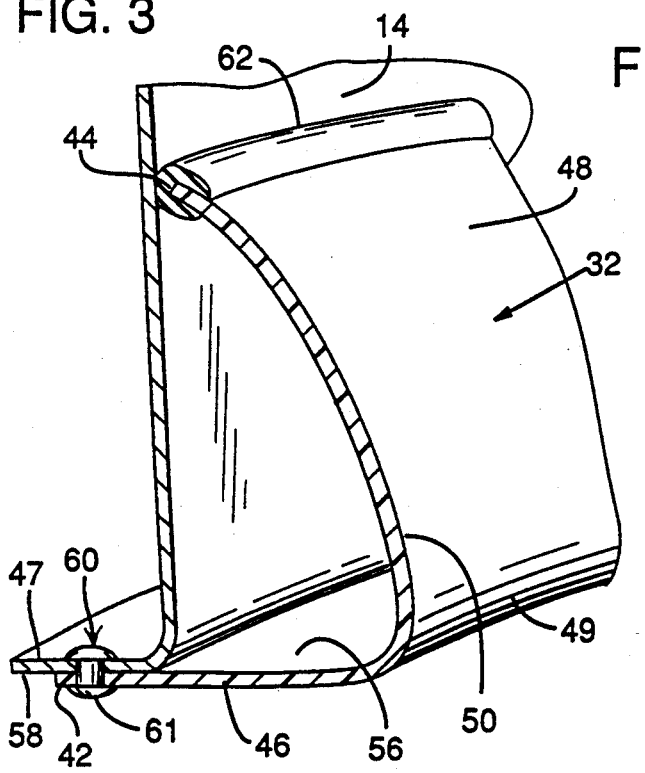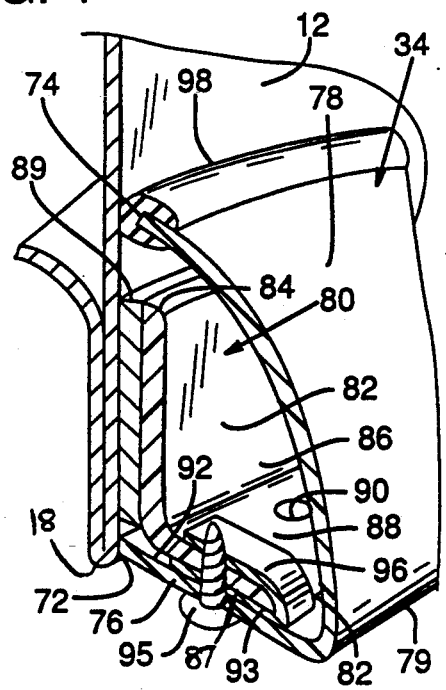

MULTIPLE PIECE VEHICLE FENDER EXTENSION

BACKGROUND AND SUMMARY OF THE INVENTION

This invention relates generally to fender extensions for vehicles and more particularly to a fender extension which includes a plurality of separate extension pieces, one of which is attached to the fender of a vehicle and another attached to a door or another separate part of the vehicle. The extension pieces together simulate the appearance of a unitary fender extension.

Vehicular body extensions in the form of fender flares or similar fender extensions are installed around the wheel openings of a vehicle to enhance and personalize the appearance of the vehicle, or to make a vehicle street legal by covering wide or tall tires that extend beyond the normal wheel well openings. Fender extensions are usually made from a unitary piece of molded plastic or fiberglass, or from modified rubber or vinyl compound extrusions. They are attached to the vehicle along the edge or margin of each wheel opening using various attachment systems, including clips or brackets. An example of a system for attaching a fender extension to a vehicle without fasteners is found in U.S. Pat. No. 4,169,608, invented by the same inventor as the present application.

Wide fender extensions have become increasingly popular. Such wide extensions cover the part of the fender adjacent the wheel opening and spread radially outwardly from the wheel opening a distance of several inches or more. Wide fender extensions provide a bold, dramatic appearance, but not all vehicles can accommodate such fender extensions because they can interfere with the opening and closing of adjacent doors. On many vehicles either the front or rear doors extend too close to the wheel opening to permit installation of conventional, unitary, wide fender extensions. On some vehicles, additional closable vehicle openings, such as gas tank doors or the like, may be close enough to the wheel opening to interfere with the use of wide fender extensions.

It would be advantageous if vehicle fender extensions, such as relatively wide fender flares or the like, were available for use on vehicles which have doors in close proximity to the wheel openings. In particular, it would be advantageous to provide fender extensions which have the appearance of unitary, wide fender flares, but which can be used on vehicles with doors close to the wheel openings.

Accordingly, the present invention provides a multi-piece vehicular body extension for use on a vehicle having a fender with a wheel opening in close proximity to a door of the vehicle. The vehicular body extension comprises a first extension molding for mounting on the fender along the edge of the wheel opening. The first extension molding includes a contoured fairing for overlying the margin of the wheel opening and for extending proximate the vehicle door. A second extension molding is also provided for mounting on a portion of the door proximate the wheel opening of the fender. The second extension molding has an outer face which is contoured to appear as a continuation on the door of the first extension molding. In its preferred form, the invention incorporates a system for mounting the first extension molding on the fender by means of a plurality of fasteners which extend through both an inner edge flange, formed on the molding, and an inturned flange formed on the edge of the wheel opening. The second extension molding is preferably attached to the door by means of a bracket installed on the door by mastic, adhesive tape, or fasteners.

BRIEF DESCRIPTION OF THE DRAWINGS

FIG. 1 is a partial, perspective view of a vehicle on which the multiple-piece vehicular body extension of the present invention is mounted, extending around the wheel opening of the vehicle.

FIG. 2 is a perspective, exploded view of selected parts of the multiple-piece vehicular body extension of FIG. 1.

FIG. 3 is a partial, partially cross-sectional, perspective view, on an enlarged scale, taken along line 3—3 of FIG. 1, showing a portion of the first extension molding in place on the vehicular fender.

FIG. 4 is a partial, partially cross-sectional, perspective view as in FIG. 3, taken along line 4—4 of FIG. 1, showing a portion of the second extension molding and mounting bracket.

FIG. 5 is a cross-sectional view, taken along line 5—5 of FIG. 1, on an enlarged scale, showing a portion of the extension molding of FIG. 1 assembled and in place on a vehicle.

FIG. 6 is a cross-sectional view as in FIG. 5 showing an alternative embodiment of the vehicular body extension shown in FIGS. 1-5 showing, in particular, an alternative form of mounting bracket for mounting the second extension molding on a vehicle door.

DETAILED DESCRIPTION OF THE PREFERRED EMBODIMENT

Referring to FIGS. 1 and 2, which respectively show the multiple-piece vehicular body extension of the present invention on and off a representative vehicle 10, the vehicle includes a rear door 12 and rear fender 14. Fender 14 includes a wheel opening 16 which is either a full wheel opening of the type which exposes the entire wheel, as illustrated, or a partially-skirted opening that partially covers the top of the wheel (not shown). The vehicle illustrated is a four-door car or four-door passenger truck-type vehicle in which the door opening 17, covered by door 12, extends into close proximity to wheel opening 16.

Vehicle door 12 includes a curved or contoured edge portion 18 (see FIG. 2) along the edge of the door closest to wheel opening 16. The curved or contoured edge 18 is also termed the proximal edge portion of the door, or the proximal door edge. On many vehicles, proximal door edge 18 is generally shaped to conform to or follow the shape or outline of the adjacent wheel opening. The spacing or width of the relatively narrow region 19 of fender 14, between proximal door edge 18 and wheel opening 16, is indicated in FIG. 2 as having a width D, also referred to as the marginal distance D between the wheel opening and proximal door edge. Distance D may vary over the length of the proximal door edge 18 on some vehicle models and, to the extent the distance does vary, the marginal distance refers to the greatest distance or maximum spacing between proximal door edge 18 and wheel opening 16. Marginal distance D is predetermined for each vehicle model and type.

The present invention is a multiple-piece vehicular body extension 30 for use on vehicle 10. Extension 30 includes a first extension molding 32 for mounting around the edge of wheel opening 16 on fender 14 and a second extension molding 34 for mounting on a portion of the vehicle door, proximate the wheel opening 16. The term "molding" as used herein is not intended to limit the fabrication technique used in making or forming the parts of the vehicular body extension. Manufacturing methods which can be used to make the parts of the vehicular body extension of the present invention include such conventional fabrication techniques as molding, extrusion, casting or the like. Both the first and second extension moldings are preferably formed of plastic, fiberglass, rubber, vinyl or another moldable or extrudable material.

Referring to FIG. 2, first extension molding 32 is an elongate, curved body which generally follows the shape of wheel opening 16. It includes a wide portion 36 extending along a first portion of its length and a narrow portion 38 extending along a second portion of its length. Wide portion 36 of molding 32 is the part that overlies the margin of the wheel opening of fender 14 and extends the farthest out (from the wheel opening). Wide portion 36 extends generally the entire length of first extension molding 32, except for the part which covers the narrow region 19 of the fender (located between the door and wheel opening). The narrow portion 38 of molding 32 is designed to overlie narrow region 19 of the fender and is defined by a notch or cut-out 40 in the wide portion 36 which forms a wide gap to accommodate the opening and closing of vehicle door 12. At each end of first extension molding 32, where the molding overlies the forward and rear corners 50, 52, respectively, of wheel opening 16, the molding includes ends 53, 54, respectively, designed to fit over and conform to the shape of the lower edges of the vehicle body. The shape of multiple-piece body extension 30, including the exact shape of ends 53, 54 on molding 32, depends on the make, model and type of vehicle the molding is designed to fit.

First extension molding 32, when in place on vehicle 10, extends around and generally conforms to the shape of wheel opening 16. The lower, longitudinal, curved edge (as viewed in FIGS. 1-3) of molding 32 is referred to as the inner edge 42, since it is radially inward relative to the wheel 43 of the vehicle. The longitudinal distal edge of molding 32, opposite inner edge 42, is referred to as outer edge 44. Outer edge 44 extends around the outer periphery of the molding, radially outward from inner edge 42, and includes the outer edge of both the wide and narrow portions of molding 32. Extending along inner edge 42 is a first extension mounting flange 46 designed to extend into the wheel opening 16 when molding 32 is installed on fender 12. Mounting flange 46 fits against or abuts against an inturned flange 47 which extends along the inside edge of the wheel opening on many or most vehicle fenders.

Cross-sectional views of first extension molding 32, taken across both wide portion 36 and narrow portion 38, are shown in FIGS. 3 and 5, respectively. In both the wide and narrow portions of the molding, first extension mounting flange 46 is integral with and joined to a fairing portion 48, which is the visible portion of the molding when it is installed on the fender. Fairing portion 48 is a contoured strip or expanse of moldable material which overlies the vehicle fender 14 along the margin of wheel opening 16. Fairing 48 does not normally function aerodynamically, as does a true aircraft or wing fairing. The term fairing is used for the visible, projecting part of molding 32 because it produces a smooth, attractive outline which enhances the appearance of the vehicle. Fairing 48 could alternatively be referred to as a flare or skirt. Fairing portion 48 extends radially outwardly from the outside corner 49 of the molding where the fairing and mounting flange 46 join or transition from one to another. The fairing generally has a curved cross-section. Its inner edge meets the first extension mounting flange 46, formed along inner edge 42 of the molding, and it terminates at outer edge 44, where the fairing contacts the vehicle fender.

In general, the cross-section of molding 32, across wide portion 36, has a shape in the form of an angular "L" turned 90 degrees, or a broad, open, reverse "J" turned approximately 45 degrees (see FIG. 3). Across narrow portion 38, molding 32 has a cross-section in the form of an off-center or unbalanced "U" (see FIG. 5). In both the wide and narrow portions of molding 32, first extension mounting flange 46 is designed to project inwardly into wheel opening 16 for attachment along the edge of the fender. Installation of first extension molding 32 on fender 12 is accomplished by joining first extension mounting flange 46 to the inturned flange 47 on wheel opening 16. The shape of the molding causes the outer edge 44 to be held against the fender without the need for rivets along the outer edge, in the manner described in U.S. Pat. No. 4,169,608 (the specification of U.S. Pat No. 4,169,608 is incorporated herein by reference). The steps in the installation process are described below.

To facilitate the attachment of first extension molding 32 on fender 14, a plurality of holes, dimples or depressions 60 are formed along first extension mounting flange 46. The holes, dimples or depressions serve as attachment locations for rivets, screws or other fasteners. Locations 60 are provided at periodic intervals where the fasteners are to be installed. Holes are drilled in the mounting flange 46 at locations 60 just prior to installation of the molding on the vehicle, in accordance with the method of installation described below. Alternatively, holes can be pre-drilled at locations 60 by the manufacturer of the moldings.

Steps in the method of installing first extension molding 32 on fender 14 include the following: (1) Pre-drill holes in first extension mounting flange 46 of molding 32, at locations 60, if such holes have not been pre-drilled by the manufacturer. (2) Position molding 32 on fender 14 with flange 46 abutting wheel opening flange 47. (3) Using locations 60 (pre-drilled in step 1) as a guide or pattern, drill holes through inturned flange 47 on wheel opening 16. (4) At the option of the installer, a length of protective piping or edge-guard material 62 (see FIGS. 2, 3 and 5) may be installed on selected portions of outer edge 44 of molding 32 to protect the finish of the fender from scratches. The preferred location for the piping on the first extension molding is along outer edge 44 of wide portion 36 (the piping material is preferably supplied with the vehicle extension kit for optional installation). (5) Install pop rivets or other fasteners in the holes formed in the molding and fender at locations 60. The fastening rivet 59 illustrated in FIG. 2 is an uncrimped bulbex-type rivet, well known in the art, which can be installed in the holes drilled at each fastening location 60. In FIG. 3, a representative standard rivet 61 is shown installed in place through holes drilled at location 60 in the fender flange 47 and first extension mounting flange 46. Rivet 61 secures molding 32 to fender 14. Any other type of fastener may alternatively be used for that purpose.

In accordance with the teaching of U.S. Pat. No. 4,169,608, the angular relationship between first mounting flange 46 and fairing 48 on molding 32 is such that, when flange 46 is attached to inturned flange 47 on fender 14, the outer edge 44 of the molding is pressed against the side of the fender. In that way, fasteners are not required along the outer peripheral edge 44 of molding 32, resulting in a clean, attractive appearance when the molding is in place on the fender.

The second part of the multiple-piece vehicular body extension is the part attached to the vehicle door, shown in FIGS. 1, 2, 4, and 5. Referred to as second extension molding 34, it is an elongate, generally arcuate or crescent-shaped piece which is curved to follow or match the shape of the edge of door 12 closest to wheel opening 16 (i.e., proximal edge 18). The edge of molding 34 oriented closest to wheel opening 16, when the molding is in place on the door, is called inner edge 72. The opposite edge is called outer edge 74 and is the edge positioned radially outward from wheel opening 16 when the molding is installed on the door. Referring to FIGS. 2, 4, and 5, second extension molding 34 has a mounting flange 76 extending along inner edge 72 and an outer face portion 78 which curves upwardly toward door 12 from the outermost corner 79 of the molding, where flange 76 joins the face portion. The outer face portion 78 extends to the outer edge 74 of the molding and constitutes the most visible part of molding 34 when the molding is in place on door 12. Face portion 78 is equivalent to fairing 48 on first extension molding 32.

Mounting flange 76, also called the second extension mounting flange, preferably extends angularly outwardly and downwardly from inner edge 72, as shown most clearly in FIG. 5. Consequently, the transitional line or corner 79 between mounting flange 76 and face portion 78 is spaced apart from door 12 and is also slightly below or radially inward from inner edge 72 of the molding. The downward or radially-inward angle of mounting flange 76 provides for a smooth, clean appearance of the assembled vehicle extension molding 30, when in place on the vehicle. It partially covers notch 40 of the first extension molding without interfering with the operation of door 12.

The shape of the outer face 78 of molding 34 is contoured to appear as an extension on door 14 of the fairing portion 48 of first extension molding 32. The shape of ace 78 generally corresponds in shape and contour to the shape of the outermost region of the wide portion 36 of fairing 48, the outermost region being that region extending generally between outer edge 44 and a line 77 spaced a distance D from inner edge 42 (as indicated at 77 in FIG. 2). The distance D between line 77 and inner edge 42 on the first extension molding is approximately the same as the marginal distance D (the width of narrow fender portion 19).

A mounting bracket 80 is used to mount second extension molding 32 on door 14. Bracket 80 is an elongate, curved device preferably made of plastic, fiberglass, modified rubber, vinyl or another moldable or extrudable material shaped to correspond to the shape of proximal edge 18 on door 12. Bracket 80, when installed on door 12, has an inner edge 82 extending along the door edge closest to wheel opening 16, and an outer edge 84 which extends along the distal, outer periphery of bracket 80, opposite the inner edge. In the first embodiment of the invention, shown in FIGS. 1-5, bracket 80 has a generally L-shaped cross-section (see FIGS. 4 and 5) that includes a broad, relatively flat mounting portion 82 for abutting against or parallel to the outside surface of the door. A projecting flange 88 extends generally outwardly, either perpendicularly or, preferably, at a downward (or radially inward) angle from the vertical mounting portion 82 of bracket 80, along inner edge 82. Projecting flange 88 is used to attach molding 34 to the bracket, as described below.

Bracket 80 is attached to door 12 by use of adhesive means such as double-sided adhesive tape or mastic, or by a plurality of fasteners such as rivets. Use of Double-sided adhesive tape, as shown at 89 in FIGS. 4 and 5, eliminates the need to drill holes in door 14 and is therefore preferred. To use the tape, the outer surface of door 14 is first prepared for adhesive bonding by, for example, swabbing the area with alcohol. A length of suitable double-sided adhesive tape 89 is installed on mounting portion 82 of bracket 80 and the tape and bracket are pressed against the outer surface of the door. A suitable tape for attaching bracket 80 to door 12 is Minnesota Mining and Manufacturing Company ("3M") double-coated acrylic foam tape, No. 4950VHB. Other adhesives such as mastic, epoxy or urethane sealant may alternatively be used. The bracket is preferably installed with the corner 83 (FIG. 5) where mounting portion 82 meets projecting flange 88 and the underside 87 of flange 88 spaced approximately one-eighth inch or more above the proximal edge 18 of door 12. That allows the underside of mounting flange 76 on molding 34 to fit flush with door edge 18.

Second extension molding 34 is attached to bracket 80 along second extension mounting flange 76. Suitable locating holes, dimples or depressions are preferably provided along mounting flange 76 at a plurality of fastener locations 90 (see FIG. 4). The holes, dimples or depressions in mounting flange 76 serve as a guide during installation of the molding on bracket 80, identifying where holes are to be drilled through flanges 76 and 88 and where fasteners are to be installed.

Assuming that mounting bracket 80 has already been installed on door 12, steps in the method of installing second extension molding 34 on bracket 80 include the following: (1) Pre-drill holes in second extension mounting flange 76 at locations 90 (identified by dimples or depressions), if such holes have not been pre-drilled by the manufacturer. (2) Position molding 34 on bracket 80 with the upper side 92 of flange 76 abutting the inner (i.e., lower) side 87 of projecting flange 88 on the bracket. (3) Using locations 90 (pre-drilled in step 1) in mounting flange 76 as a guide or pattern, drill holes through projecting flange 88 on bracket 80. (4) Install protective piping or edge-guard material 98 on outer edge 74 of molding 34, if desired, as shown in FIGS. 4 and 5. Use of edge guard material 98 over outer edge 74 of the molding protects the finish on door 12 from scratching. (5) Assuming tinnerman-type fasteners are to be employed in attaching second extension molding 34 to bracket 80, install tinnerman-type screw-receiving sockets 96 over projecting flange 88 at the locations where holes were drilled in step (3) above, to receive and secure threaded screws. (6) Position second extension molding 34 over bracket 80 with the holes in mounting flange 76 aligned with the holes drilled in projecting flange 88 in step (3) above, and install screws 95 through the underside of projecting flange 76 and into the tinnerman-type screw-receiving sockets 96. As an alternative to the tinnerman fasteners, other types of fasteners may be used to secure the molding to the bracket, such as pop-rivets, scrivets, plastic screws or the like.

The angular relationship between the second extension mounting flange 76, the projecting flange 88 on bracket 80, and the outer face 78 of molding 34, is such that attachment of the mounting flange to the bracket causes the outer edge 74 of molding 34 to be pressed against the side of door 12. Such an angular relationship is similar to the system for installing extensions on fenders described in U.S. Pat. No. 4,169,608, in that it eliminates the need for additional fasteners along the outer edge 74 of the molding. The result is a clean, attractive appearance for the molding, which completely covers the mounting bracket. Mounting screws 95 are only visible from the underside of molding 34, and even the mounting screws are invisible when the door is closed.

When first extension molding 32 has been installed on fender 12 and second extension molding 34 has been installed on door 14, the two moldings present a generally unified appearance whenever the door of the vehicle is closed. FIG. 5 illustrates the close-fitting juxtaposition of the first and second extension moldings 32, 34, respectively, along a portion of the narrow part 19 of fender 14. Referring to FIG. 1, the outer face 78 of second extension molding 34 is contoured to match the overall shape of the outermost region (outwardly from line 77 in FIG. 2) of the wide portion of first extension molding 32, and appears as a continuation on the door of fairing 48. When the vehicle door is closed, second extension molding 34 fits into the cut-out or notch 40 (see FIG. 2) in the outer periphery of first extension molding 32.

An alternative mounting system for second extension molding 34 is shown in FIG. 6. The embodiment of FIG. 6 employs a bracket which is somewhat different in shape from bracket 80 shown in FIGS. 1-5 (referred to as the first embodiment), but performs essentially the same function. Referring to FIG. 6, in which the reference numbers used and described in FIG. 5 are repeated for like elements, second extension molding 34 is retained on door 12 by means of a bracket 100. Bracket 100 is an elongate, curved, molded or extruded device that includes a projecting flange 108 which extends to the inner edge 101 of the bracket (the edge located radially inwardly toward wheel opening 16 when the bracket is in place on door 12). Bracket 100 also includes an outer edge 104 which extends along the outer periphery of the bracket opposite inner edge 102. Projecting flange 108 extends generally outwardly, away from door 12, preferably at an angle like flange 88 on bracket 80 of the first embodiment. Projecting flange 108 serves the same function on bracket 100 as projecting flange 88 on bracket 80.

The mounting portion 110 of bracket 100, where the bracket attaches to the door, is different from the mounting portion 82 of bracket 80 in that a ridge 112 is provided on the mounting portion which extends outwardly, away from the outer surface of door 12. Ridge 112 extends along the curved length of mounting portion 110 and is joined to flattened, non-ridge portions 114, 116 which are oriented to fit flush against door 12. Bracket 100 is installed on door 12 along portions 114, 116 by any suitable means, such as rivets 118, 120. Alternatively, bracket 100 can be installed using an adhesive mounting technique such as double-sided tape or mastic, as shown in the first embodiment, at 89, in FIGS. 4 and 5. If rivets 118, 120 are used, a plurality of such rivets will be installed at suitable intervals along the length of bracket 100 to securely attach the bracket to door 12. Holes must be drilled through rivet mounting portions 114, 116 and door 12 to receive rivets 118, 120, as will be understood by those skilled in the art. Once bracket 100 is installed on door 12, second extension 34 is mounted on the bracket by the mounting steps described below.

The steps in the method of installing second extension molding 34 on bracket 100 are as follows: (1) Pre-drill holes in second extension mounting flange 76 at the fastener locations 90, as described in the first embodiment. (2) Position adhesive such as mastic or double-sided adhesive tape on the top of ridge 112, at 123. (3) position molding 34 over bracket 100 with the upper side 92 of flange 76 abutting the inner (i.e., lower) side of projecting flange 108. (4) Press face portion 78 of molding 34 against the adhesive 123 on ridge 112 to cause the inside surface of the face portion 78 of molding 34 to adhere to the ridge. (5) Drill holes through projecting flange 108 at the locations 90 (previously drilled in mounting flange 76 in step 1). (6) Install protective piping or edge-guard material 98 on outer edge 74 of molding 34, if desired. (7) If tinnerman-type fasteners are to be used to secure second extension molding 34 on bracket 100, install tinnerman-type screw-receiving sockets 96 over projecting flange 108 at the locations where holes were drilled in step (5) above. (8). Install screws 95 through the holes in flange 76 and the tinnerman-type screw-receiving sockets 96. As in the first embodiment, alternative types of fasteners can be used to secure flange 76 to projecting flange 108 on bracket 100, such as, for example, pop-rivets, scrivets, plastic screws or the like.

Ridge 112 in the bracket of FIG. 6 strengthens the bond between the molding and the vehicle door by providing an additional attachment point between bracket and second extension molding 34. Other alternative types of brackets for supporting second extension molding 34 on door 12 will occur to those skilled in the art within the scope of the present invention. 10 The multiple-piece extension molding of the present invention does not interfere with the normal operation of door 12. It allows for the installation of wide moldings or fairings on vehicles which have doors in close proximity to the wheel openings. It is usable on vehicles with either front or rear doors in close proximity to a wheel opening. The invention also can be used on vehicles which have doors or closures other than passenger ingress-egress doors in close proximity to the wheel opening, for example, gas tank doors or the like.

Alternative embodiments of the multiple-piece vehicular body extension are possible within the scope of the present invention. For example, three or more extension pieces could be employed on vehicles that have more than two separable body parts, such as removable fender skirts or other removable access panels, in close proximity to the wheel opening. The other removable vehicular body parts (such as fender skirts) can also be considered doors of the vehicle, within the scope of the present invention, in that such removable body parts cover openings in the vehicle body and are removable to provide access to those openings. A fender skirt, for example, can be thought of as a removable vehicle access door and the vehicular body extension of the present invention could include a first extension molding mounted on the vehicle fender and a second extension molding mounted on the removable fender skirt. Similar analogous types of vehicle doors to which the multiple-piece vehicular body extension of the present invention could be applied include gas tank filler access doors, vent panels, and other types of service access doors. Regardless of the type of access door found in close proximity to the wheel opening of a fender, a multiple-piece vehicular body extension in accordance with the present invention can be installed to give the appearance of a unitary body extension covering both the fender and portions of the door proximate the wheel opening. As another alternative embodiment, the mounting bracket for holding the second extension molding on the door could be made of a material other than moldable or extrudable material, for example, metal.

It will be understood by those skilled in the art that the exact shape and contour of the illustrated preferred embodiment of the present invention is suggestive only and that vehicular body extensions of the type shown are generally shaped and designed to fit specific vehicle models and types. Accordingly, the shapes of the wheel opening and the proximal edge of the adjacent door shown in the figures are meant to be representative of typical wheel openings and doors, but different vehicles may employ different shapes for those elements. Accordingly, the shape of each extension molding piece needs to be customized to fit the particular shape and contours of the vehicle to which it is applied.

While the present invention has been shown and described with reference to the foregoing preferred embodiment, it should be understood that other changes in form and detail may be made without departing from the scope and spirit of the invention as defined in the appended claims.

What is claimed is:

1. A multiple-piece vehicular body extension for use on a vehicle having a fender with a wheel opening in close proximity to a door of the vehicle, the door having a proximal edge portion along the edge closest to the wheel opening spaced a predetermined marginal distance from the wheel opening, the vehicular body extension comprising:
   a first extension molding for mounting on the fender along the edge of the wheel opening, including a contoured fairing for overlying the entire margin of the wheel opening and for extending proximate the vehicle door, the fairing having a narrow portion for overlying the margin of the wheel opening between the wheel opening and the proximal edge portion of the door and a wide portion which extends over the remainder of the margin of the wheel opening and which has a width which exceeds the marginal distance; and
   a second extension molding for mounting on a portion of the door proximate the wheel opening of the fender, the second extension molding having an outer face which is contoured to appear as an extension on the door of the fairing portion of the first extension molding.

2. A multiple-piece vehicular body extension for use on a vehicle having a fender with a wheel opening in close proximity to a door of the vehicle, comprising:
   a first extension molding for mounting on the fender along the edge of the wheel opening, including a contoured fairing for overlying the entire margin of the wheel opening and for extending proximate the vehicle door, a portion of the fairing having a maximum width that exceeds the distance between the wheel opening and the vehicle door, and
   a second extension molding for mounting on a portion of the door proximate the wheel opening of the fender, the second extension molding having an outer face which is contoured to appear as an extension on the door of the fairing of the first extension molding.

3. An extension as in claim 2 in which the first extension molding is elongate and curved to generally follow the shape of the wheel opening and has an inner edge for extending along the wheel opening and an outer edge extending along the distill edge of the fairing, opposite the inner edge, and the second extension molding is elongate and shaped to generally follow the shape of the door edge closest to the wheel opening and has an inner edge for extending along the door edge closest to the wheel opening and an outer edge opposite the inner edge, wherein the outer edge of the portion of the first extension molding having a maximum width that exceeds the distance between the wheel opening and the vehicle door and the outer edge of the second extension molding are generally the same distance from the wheel opening when installed.

4. A multiple-piece vehicular body extension for use on a vehicle having a fender with a wheel opening in close proximity to a door of the vehicle and having an inturned flange on the fender extending along the edge of the wheel opening, the vehicular body extension comprising:
   a first extension molding for mounting on the fender along the edge of the wheel opening, including a contoured fairing for overlying the margin of the wheel opening and for extending proximate the vehicle door, the first extension molding having an inner edge for extending along the wheel opening and an outer edge extending along the distal edge of the fairing, opposite the inner edge, and having a first extension mounting flange extending along the inner edge for attachment to the inturned flange on the fender by means of a plurality of fasteners, wherein the first extension mounting flange has an angular relationship with the fairing which, when the first extension mounting flange is attached to the inturned flange on the fender, presses the outer edge of the first extension molding against the side of the fender, and
   a second extension molding for mounting of a portion of the door proximate the wheel opening of the fender, the second extension molding having an outer face which is contoured to appear as an extension on the door of the fairing portion of the first extension molding.

5. A multiple-piece vehicular body extension for use on a vehicle having a fender with a wheel opening in close proximity to a door of the vehicle, comprising:
   a first extension molding for mounting on the fender along the edge of the wheel opening, including a contoured fairing for overlying the entire margin of the wheel opening and for extending proximate the vehicle door,
   a second extension molding for mounting on a portion of the door proximate the wheel opening of the fender, the second extension molding having an outer face which is contoured to appear as an extension on the door of the fairing portion of the first extension molding, and
   a mounting bracket for attachment to the outside surface of the vehicle door proximate the wheel opening to support the second extension molding thereon.

6. A multiple-piece vehicular body extension for use on a vehicle having a fender with a wheel opening in close proximity to a door of the vehicle, comprising:
  a first extension molding for mounting on the fender along the edge of the wheel opening, including a contoured fairing for overlying the margin of the wheel opening and for extending proximate the vehicle door,
  a second extension molding for mounting on a portion of the door proximate the wheel opening of the fender, the second extension molding having an outer face which is contoured to appear as an extension on the door of the fairing portion of the first extension molding, and
  a mounting bracket for attachment to the outside surface of the vehicle door proximate the wheel opening to support the second extension molding thereon, the mounting bracket including a projecting flange which projects outwardly from the outside surface of the vehicle door when the bracket is attached to the door, the second extension molding being supportable on the bracket by means of fasteners which join together the second extension molding and the projecting flange.

7. An extension as in claim 6 for use on a vehicle wherein the door in close proximity to the wheel opening has a proximal edge portion along the edge of the door closest to the wheel opening, the proximal edge portion being generally spaced a predetermined marginal distance from the wheel opening, in which the second extension molding and bracket each include an inner edge for orienting closest to the wheel opening, and an outer edge opposite the inner edge, and the projecting flange on the bracket extends along the inner edge of the bracket, the second extension molding including a second extension mounting flange along the inner edge thereof, and the portion of the second extension molding between the mounting flange and the outer edge having an angular relationship with the second extension mounting flange which, when the second extension mounting flange is attached to the projecting flange on the bracket, presses the outer edge of the second extension molding against the side of the door.

8. An extension as in claim 7 including a plurality of fasteners extending through the second extension mounting flange and the projecting flange on the bracket to attach the second extension molding to the bracket.

9. An extension as in claim 5 including adhesive means for attaching the bracket to the outside surface of the door.

10. A multiple-piece vehicular body extension for use on a vehicle having a fender with a wheel opening in close proximity to a door of the vehicle, comprising:
  a first extension molding for mounting on the fender along the edge of the wheel opening, including a contoured fairing for overlying the margin of the wheel opening and for extending proximate the vehicle door,
  a second extension molding for mounting on a portion of the door proximate the wheel opening of the fender, the second extension molding having an outer face which is contoured to appear as an extension on the door of the fairing portion of the first extension molding, and
  a mounting bracket for attachment to the outside surface of the vehicle door proximate the wheel opening to support the second extension molding thereon, the mounting bracket including a mounting portion for attachment to the outside surface of the vehicle door, a projecting flange which projects outwardly from the mounting portion when the bracket is attached to the door, and a ridge extending outwardly from the mounting portion, and wherein the second extension molding is supported on the bracket by attachment to the projecting flange and to the ridge.

11. A multiple-piece vehicular body extension on a vehicle of the type which has a fender with a wheel opening and a vehicle door in close proximity to the wheel opening of the fender, the door of the vehicle having a proximal edge portion along the edge closest to the wheel opening which is configured to generally match the shape of the adjacent wheel opening and is spaced therefrom a predetermined marginal distance, the vehicular body extension comprising:
  a first extension molding attached to the fender along the margin of the wheel opening, the first extension molding including a contoured fairing covering portions of the fender along the margin of the wheel opening and extending proximate to the vehicle door, the fairing having a narrow portion for covering the part of the fender between the wheel opening and the proximal edge portion of the door and a wide portion covering portions of the fender other than between the wheel opening and the proximal edge portion of the door, the wide portion extending outwardly from the wheel opening a distance greater than marginal distance, and
  a second extension molding attached to the vehicle door close to the wheel opening of the fender, the second extension molding having an outer face which generally corresponds in shape and contour to part of the wide portion of the fairing on the first extension molding spaced farther than the marginal distance from the wheel opening, such that the outer face of the second extension molding appears as an extension on the door of the fairing portion of the first extension molding, whereby the first and second extension molding present a generally unified appearance.

12. An extension on a vehicle as in claim 11 in which the first extension molding is an elongate curved body having an inner edge which extends along the wheel opening when installed on the vehicle, a first extension mounting flange extending along inner edge of the first extension molding, and an outer edge extending along the distill edge of the fairing on the opposite side of the first extension molding from the first extension mounting flange, the first extension molding being configured for mounting on a fender that includes an inturned flange on the edge of the wheel opening and wherein the fairing and the first extension mounting flange are joined together with an angular relationship in which the outer edge of the fairing is pressed against the fender when the first mounting flange is attached to the inturned flange on the fender.

13. An extension on a vehicle as in claim 12 in which the first extension molding is attached to the inturned flange on the edge of the wheel opening by a plurality of rivets.

14. An extension as in claim 6 in which the second extension molding is attached to the projecting flange on the bracket along the edge of the door which is closest to the wheel opening of the fender.

15. An extension on a vehicle as in claim 14 in which the door of the vehicle has a proximal edge portion along the edge closest to the wheel opening which is configured to generally match the shape of the adjacent wheel opening, the bracket and the second extension molding each include an inner edge closest to the wheel opening and outer edge opposite the inner edge, the projecting flange on the bracket extends along the inner edge thereof, the second extension molding includes a second extension mounting flange along the inner edge thereof, and the outer face of the second extension molding has an angular relationship with the second extension mounting flange such that attachment of the second extension mounting flange to the projecting flange of the bracket causes the outer edge of the second extension molding to be pressed against the side of the door.

16. An extension on a vehicle as in claim 15 in which the second extension mounting flange on the second extension molding and the projecting flange on the bracket are attached to one another by means of a plurality of fasteners.

17. An extension on a vehicle as in claim 16 in which the attaching bracket includes a projecting flange extending outwardly from the door along the edge thereof which is closest to the wheel opening of the fender, and includes a projecting ridge spaced a greater distance than the projecting flange from the edge of the bracket which is closest to the wheel opening of the fender, and wherein the second extension molding is attached to the bracket along both the projecting flange and the ridge.

18. A multiple-piece fender flare for use on a vehicle having a fender with a wheel opening which is in close proximity to a door of the vehicle along at least a portion of the edge of the wheel opening, comprising:
- a first fender flare molding for mounting on the fender along the edge of the wheel opening, including a contoured fairing for overlying the entire margin of the wheel opening, a portion of the fairing extending proximate the vehicle door, and
- a second fender flare molding for mounting on a portion of the door proximate the wheel opening of the fender, the second molding having an outer face which is contoured to appear as an extension on the door of the fairing portion of the first molding.

* * * * *